United States Patent [19]
Beny et al.

[11] 4,079,938
[45] Mar. 21, 1978

[54] TOY VEHICLE AND TOY VEHICLE GAME

[75] Inventors: Janos Beny, Redondo Beach; James D. Moore, Rancho Palos Verdes; John W. Ryan, Los Angeles, all of Calif.

[73] Assignee: Ideal Toy Corporation, Hollis, N.Y.

[21] Appl. No.: 783,833

[22] Filed: Apr. 1, 1977

Related U.S. Application Data

[62] Division of Ser. No. 747,441, Dec. 6, 1976.

[51] Int. Cl.² .................. A63F 9/14; A63H 18/12
[52] U.S. Cl. ................................... 273/86 B; 46/262
[58] Field of Search ............... 273/86 B; 46/210, 211, 46/212, 213, 251, 252, 253, 254, 255, 256, 257, 258, 259, 260, 261, 262

[56] References Cited

U.S. PATENT DOCUMENTS

| 2,149,180 | 2/1939 | Muller | 46/212 |
|---|---|---|---|
| 3,232,005 | 2/1966 | Lahr | 46/211 X |
| 3,386,406 | 6/1968 | Tsunoda | 46/262 X |
| 3,453,970 | 7/1969 | Hansen | 46/251 X |
| 3,467,311 | 9/1969 | Ernst | 273/86 B X |
| 3,813,812 | 6/1974 | Barlow et al. | 46/259 |
| 3,965,612 | 6/1976 | Asano | 46/212 |

*Primary Examiner*—Anton O. Oechsle
*Attorney, Agent, or Firm*—Richard M. Rabkin

[57] ABSTRACT

A toy vehicle is provided for use in a toy vehicle game including an endless track defining at least two parallely extending vehicle lanes in which two or more toy vehicles are adapted to be operated. The toy vehicles each include a reversible rotary drive motor and a transmission operatively engaged between the motor and two drive wheels for rotating one or the other of the drive wheels in response to the direction of rotation of the drive motor, thereby biasing the car against one or the other of the side walls of the track to guide the vehicle along its path of travel in one or the other of the lanes. The track includes electrical contact strips which supply power to the drive motor of the vehicles through current collectors mounted thereon. A control system permits the operators to separately and independently control current to the contact strips and also to selectively reverse the polarity of the current so that the operators can vary the speed of their associated vehicles and cause the vehicles to move from one lane to the other. In one form of the invention an additional toy vehicle operated as a drone car at constant speed is provided presenting an obstacle along the track which the players must pass by properly controlling their respective toy vehicles.

9 Claims, 15 Drawing Figures

TOY VEHICLE AND TOY VEHICLE GAME

This application is a division of U.S. Patent Application Ser. No. 747,441 filed Dec. 6, 1976, the disclosure of which is incorporated herein by reference as though repeated here in its entirety.

The present invention relates to a toy vehicle and toy vehicle game. More particularly the invention relates to a toy vehicle game in which the toy vehicles are separately controlled by the players to enable them to turn out from one lane to the other and pass other vehicles on the track.

With the ever increasing popularity of toy vehicle games, such as for example the well known "slot car" games, there is an increasing demand for more realistic action. To this end attempts have been made in the past to provide "slot car" type games with speed control systems, as for example by varying current flow to the vehicles in the game. To further enhance such realism the slot arrangements in such games also provide for crossing the vehicles from one side of the track to another, to simulate an actual changing of lanes. However, the vehicle is in fact constrained to a fixed predetermined and unvariable path.

Since the play value of such previously proposed vehicle games is limited to the regulation of speed of travel, attempts have been made to provide toy vehicle games which enable an operator to control movement of the vehicle from one lane to the other without the constraint of a guide slot in the track. Such systems include for example the type shown in U.S. Pat. No. 3,797,404, wherein solenoid actuated bumpers are used to physically push the vehicle from one lane to the other by selectively engaging the bumpers along the side walls of the track. It is believed that this type of system will not insure movement of the vehicle from one lane to the other, particularly at slow speeds, and the bumper movements for pushing the vehicle are not realistic.

Other attempts to provide for vehicle control for moving the vehicle from one lane to the other involve relatively complicated steering control mechanisms which respond to the switching on and off of current to the toy vehicle as supplied through contact strips in the track surface. Such systems are disclosed for example in U.S. Pat. Nos. 3,774,340 and 3,837,286. However, in addition to the relative complexity of the steering arrangements, the vehicles will of course lose speed when the current supply is shut off, so that the vehicle will slow down and the realistic effect desired to be produced is affected.

Still other steering systems have been provided in toy vehicles wherein the vehicle's steering is controlled in response to a reversal of the polarity of the current flow to the electrical drive motor in the vehicle. Such systems are disclosed for example in U.S. Pat. Nos. 3,453,970 and 3,813,812, which avoid the problem of stopping current flow completely to the motor so that there is little or no loss of speed, but their steering systems contain numerous moving parts which will wear and require constant attention. In U.S. Pat. No. 3,453,970 to Hansen, the electrical wires connecting the motor to the current collectors of the vehicle are used to aid in the steering operation and thus may well work loose during use of the vehicle. Another reversing polarity system is shown in U.S. Pat. No. 3,232,005 wherein the toy vehicle does not operate on a track and the steering control is not provided for switching lanes, but rather to provide an apparently random travel control for the vehicle.

Still another toy vehicle game which has been suggested to avoid the constraints of slot car type systems, is disclosed in U.S. Pat. No. 3,239,963 wherein a relatively complex steering control is provided which is responsive to the actuation of a solenoid mounted in the toy vehicle and is controlled remotely by the players.

It is an object of the present invention to overcome the limitations of previously proposed toy vehicle games wherein toy vehicles are permitted to turn out and move from one lane to the other without the restraint of a guide slot or the like.

Still another object of the present invention is to provide a toy vehicle which is adapted to move along a guide track and change from one lane to the other, under the control of a player.

A still further object of the present invention is to provide a toy vehicle game in which separate vehicles can be separately controlled by the players to move from one lane to the other and pass one another.

A still further object of the present invention is to provide a toy vehicle having a relatively simple drive transmission responsive to the polarity of current flow to an electrical motor in the vehicle, to drive the vehicle in one or the other of the lanes of the track.

A still further object of the present invention is to provide a toy vehicle having a relatively simple drive transmission system which enables one or the other of its two rear drive wheels to be driven in response to the polarity of current supplied to the electrical motor in the vehicle.

A still further object of the present invention is to provide an improved toy vehicle game.

Another object of the present invention is to provide a toy vehicle and toy vehicle game of the character described which is relatively simple in construction and durable in operation.

Yet another object of the present invention is to provide a toy vehicle and toy vehicle game, as well as a control system therefor, which is relatively simple and economical to manufacture.

In accordance with an aspect of the present invention, a toy vehicle is provided for use in a toy vehicle game, which vehicle includes a frame, a body mounted on the frame, and a plurality of ground engaging wheels, including a pair of drive wheels. The drive wheels are mounted in the frame for independent rotation in laterally spaced vertical planes and a reversible electric motor is also provided for selectively driving the wheels. A drive transmission is mounted in the frame to connect the output of the electrical motor to the drive wheels. This drive transmission includes at least one transmission element which is movably mounted in the frame for movement between first and second positions in response to the direction of rotation of the drive motor thereby to drive one or the other of the drive wheels. The toy vehicles are preferably used on an endless track having laterally spaced side walls defining two vehicle lanes therebetween. When the vehicles are operated with only one or the other of their drive wheels driven from their respective motors, the vehicles will move into engagement with and be guided along one of these side walls.

The power supply to the electrical motors of the vehicles is provided through electrical contact strips located in the lanes of the vehicle track. This power supply system is constructed to enable the operators to separately control the speed of the vehicles and also to separately reverse the polarity of current flow to the electrical motors of the vehicles, whereby the vehicles will change lanes. In addition the vehicles are provided with a relatively simple shock absorbing front end system which absorbs the impact of the vehicle against the side walls during a lane change and directs the front wheels of the vehicle in the desired path of travel.

The above, and other objects, features and advantages of this invention will be apparent in the following detailed description of illustrative embodiments thereof, which are to be read in connection with the accompanying drawings, wherein:

Figure 1:
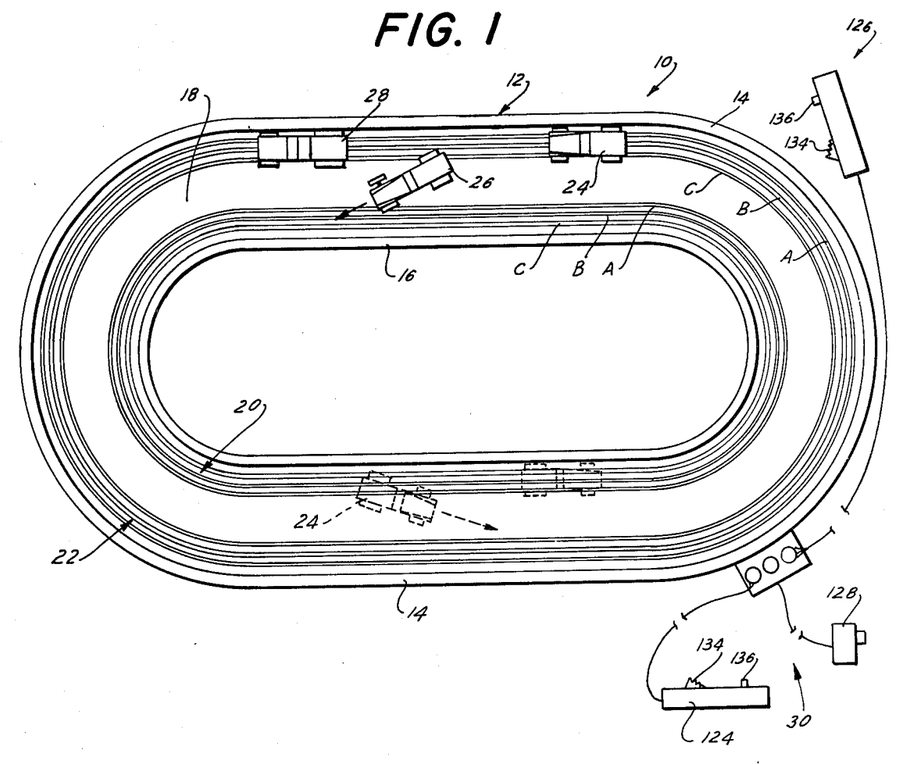
FIG. 1 is a plan view of a toy vehicle game constructed in accordance with the present invention.

Referring now to the drawings in detail, and initially to FIG. 1 thereof, the toy vehicle game 10, constructed in accordance with the present invention, includes an endless plastic track 12 having a pair of laterally spaced upstanding side walls 14, 16 and a road bed or tread surface 18 extending therebetween. The road bed 18 has a width sufficient to define at least two vehicle lanes 20, 22 thereon along which a plurality of vehicles can be operated.

In the illustrative embodiment of the present invention the toy vehicle game includes operator controlled vehicles 24, 26 which are of substantial identical construction except for the arrangement of their current collectors as described hereinafter. In addition, a drone car 28, which moves along the track at a relatively constant speed is also provided.

Vehicles 24, 26 are separately controlled by the players through a control system 30 which enables the players to vary current supply to the electrical motors in the vehicles, thereby to vary the vehicle speed. The controllers also enable the players to change the polarity of current supplied to the respective vehicle motors, whereby the vehicles can be switched by the players from one lane to the other. The drone car 28 on the other hand moves along the vehicle track at a constant speed providing an obstacle along the track which the player controlled cars 24, 26 must pass. The front wheels of the drone car are preferably canted in one direction or the other so that the drone will normally be driven in either the inner or the outer lane depending on the position of the wheels. This vehicle includes an electric motor operated by a battery contained within the vehicle, and connected through a direct drive transmission of any convenient construction to the rear wheels thereof. Preferably, drone vehicle 28 is of the type illustrated and described in detail in co-pending U.S. Patent Application Ser. No. 747,442 filed Dec. 6, 1976, (attorney's docket No. CM&S 182.064) and commonly assigned herewith. The disclosure of said U.S. Patent Application Ser. No. 747,442 (attorney's docket No. CM&S 182.064) is incorporated herein by reference.

Figure 2:
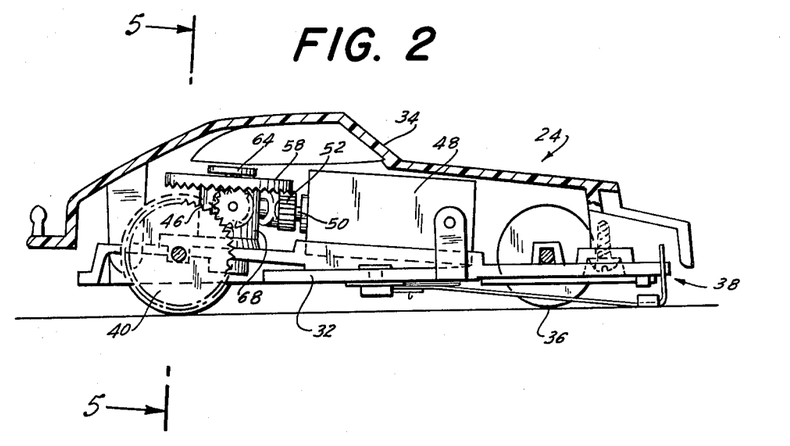
FIG. 2 is a longitudinal sectional view of the toy vehicle adapted for use with the game of FIG. 1.
Figure 3:
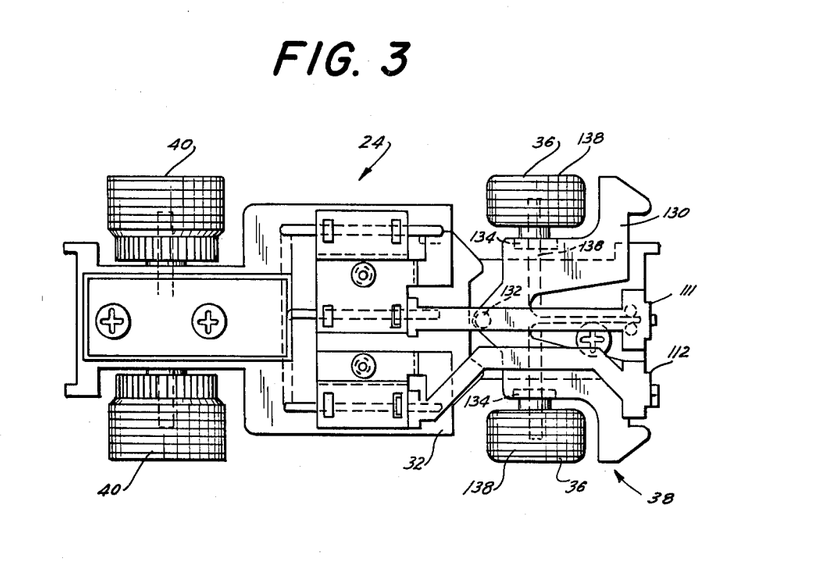
FIG. 3 is a bottom view of one of the toy vehicles illustrated in FIG. 1.
Figure 4:
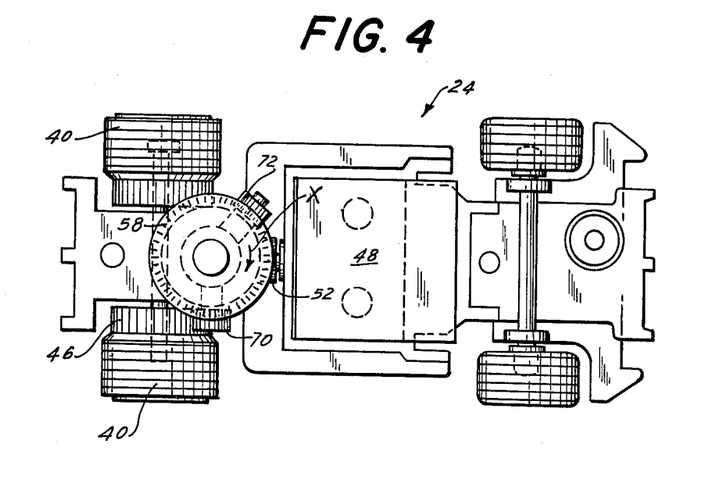
FIG. 4 is a top plan view of the toy vehicle shown in FIG. 2, but with the body removed.
Figure 5:
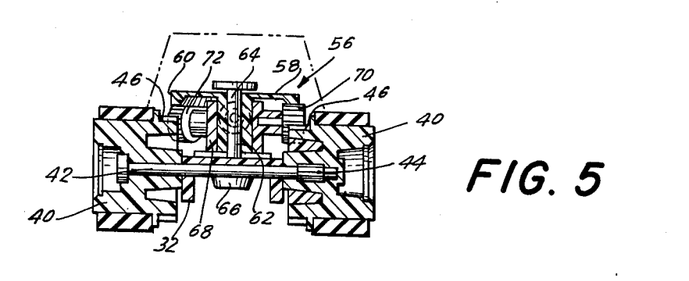
FIG. 5 is a sectional view taken along line 5—5 of FIG. 2.

Toy vehicle 24 is illustrated in detail in FIGS. 2–4. As seen therein the vehicle includes a frame or chassis 32 of any covenient construction, and a removable plastic body or shell 34 which may be snap fit on frame 32 in any convenient manner. A pair of front wheels 36 are rotatably mounted on the frame, through a shock absorbing front end system 38, described more fully hereinafter, while the rear wheels 40 are rotatably mounted for independent rotation on a shaft 42 rotatably mounted in frame 32. (See FIG. 5). One of the drive wheels 40 is fixed on shaft 42 by a spline 44 or the like, while the other of the wheels is freely rotatably mounted on the shaft. Alteratively both wheels can be freely rotatably mounted on the shaft or axle 48. With either arrangement the wheels can be separately and independently driven.

Each of the drive wheels 40 in the illustrative embodiment of the present invention is formed from either a molded plastic material or from a cast metal material, and has on its inner side an integral spur gear 46 formed thereon by which rotary power is supplied to the resepctive wheels.

The power for driving the toy vehicle is supplied from a D. C. electric motor 48 mounted on frame 32 in any convenient manner. The electric motor is of conventional D. C. construction and includes a rotary output member or shaft 50 connected to the rotor of the motor in the usual manner. In the embodiment of the invention illustrated in FIG. 2 a spur gear or output drive element 52 is secured to shaft 50 for rotation thereby. This output member is drivingly engaged with the transmission system 56 which is responsive to the direction of rotation or the output drive element (i.e. the direction of rotation of output shaft 50 of motor 48, due to the polarity of current supplied to the motor) to selectively drive the drive wheels 40.

Figure 6:
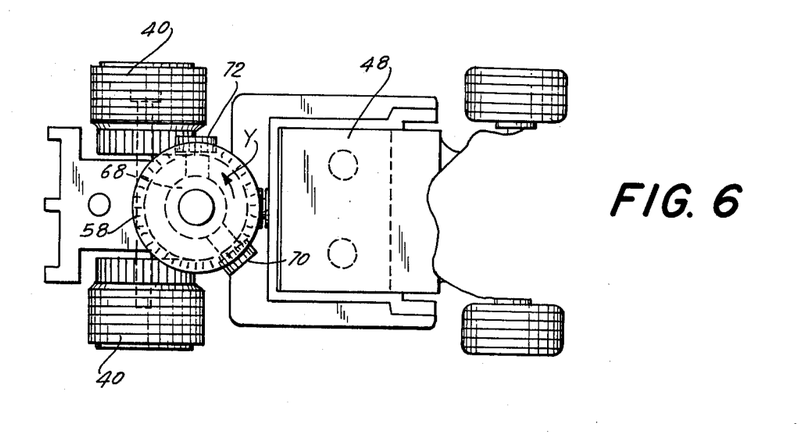
FIG. 6 is a top plan view, similar to FIG. 4, but showing another position of the drive transmissions of the vehicle.

In the embodiment of the invention illustrated in FIGS. 2 and 4–6, transmission system 56 includes a crown gear 58 having downwardly extending teeth 60 and a central collar 62. A mounting pin 64 extends through collar 62 and is secured at its lower end 66 in frame 32 so that crown gear 58 is freely rotatably mounted thereon. A movable transmission element including a sleeve or gear support member 68 is rotatably mounted on collar 62. A pair of spur gears 70, 72 are in turn rotatably mounted on sleeve 68 for rotation along axes extending generally perpendicularly to the axis of rotation of crown gear 58. These gears 70, 72 are positioned at an angle to each other (see FIG. 4) in engagement with crown gear 58. As a result of this arrangement when the motor 48 is operated crown gear 58, due to its engagement with the spur gear 52, will be rotated in either a clockwise or counterclockwise direction, as seen in FIGS. 4 and 6, depending upon the polarity of the current supplied to motor 48. At the same time gears 70, 72 will be continuously rotated by the crown gear. However, because gears 70, 72 are mounted on the rotatable sleeve 68, the engagement between the gears 58, 70, 72 will cause sleeve 68, and thus gears 70, 72 to rotate axially about pin 64 and collar 62, in a clockwise or counterclockwise direction according to the direction of rotation of the crown gear. As a result, as seen in FIG. 4, when crown gear 58 is rotated in a clockwise direction indicated by the arrow X gears 70, 72 will also be moved in a clockwise direction so that gear 70 engages the gear 46 of the lower wheel 40 in the vehicle shown in FIG. 4. Thus the right drive wheel of the vehicle will be driven, while the left drive wheel will be free to rotate.

In the game illustrated in FIG. 1 when vehicle 24 is in the outside lane and power is supplied to its right wheel 40 in this manner, as a result of the polarity of current supplied to the motor 48, the toy vehicle will be caused to move from the outer lane to the inner lane, as is shown in FIG. 1 occurring with the vehicle 26. When this occurs the front end of the vehicle will engage the inner wall 16 of the track and the continued drive of its right wheel will cause the vehicle to move along wall 16 in the inner lane 20 of the track. Of course, if the vehicle is moving at a relatively high rate of speed as it goes about a curve in the track it may be propelled by centrifugal force into the outer lane. However, if the drive to the right hand wheel is maintained it will move inwardly again to the inner lane as previously described.

On the other hand, when the polarity of current supplied to the motor 48 is reversed crown gear 58 will rotate in a counterclockwise direction, as illustrated by the arrow Y in FIG. 6. When this occurs gears 70, 72 will be driven in an opposite direction and sleeve 68 will be caused to rotate in the same direction as gear 58. This will engage gear 72 with gear 46 of the left drive wheel 40 (i.e. the upper wheel 40 in FIG. 6) so that this wheel is driven while the right wheel is free to rotate.

When the left wheel of the vehicle is driven in this manner, a bias is applied to the vehicle which will cause it to move to the right. Thus, as illustrated in FIG. 1 by the vehicle 24 shown in dotted lines, when the vehicle is in the inner lane 20 of track 12 and the polarity of the current flow to the motor 48 is changed so that its left wheel 40 is driven, the vehicle will be biased towards its right into outer lane 22. When the front end of the vehicle hits outer wall 14 it will continue to move along that outer wall in outer lane 22 until the polarity of current supplied to the motor 48 is again reversed. In this regard it is noted that because of the arrangement of gears 52, 58, 70 and 72 the vehicle will always be propelled in a forward direction regardless of the direction of rotation of the output element 52 of the motor.

In order to supply current to the toy vehicles the track surface 18 is provided with a plurality of electrical contact strips in each of the lanes 20, 22. In the illustrative embodiment of the invention each lane is provided with three contact strips A, B and C respectively. The strips are formed of an electrically conductive metallic material and are embedded in the track so that they are substantially flush with the surface of the track and present no obstacle to movement of the vehicles from one lane to the other. Current is supplied to these strips, as described hereinafter, and is collected by current collectors mounted on the frame 32 of the toy vehicles in predetermined locations.

The contact strips in each lane are paired with each other, i.e., the A strip in one lane is electrically connected to the A strip in the other lane, the B strips are connected to each other and the C strips are connected to each other. The C strips are connected to electrical ground and the A and B strips are provided to separately supply current and control polarity of the current to the respective vehicles, so that two vehicles can operate in the same lane and still be separately controlled. For this reason the current collector and the vehicles are arranged to associate the respective vehicles with only one of the pairs of contact strips. For example, vehicle 24 will obtain current from strips B, while vehicle 26 will obtain current only from strips A.

As illustrated in FIG. 3 vehicle 24 is provided with two current collectors 111, 112 with the current collector 112 thereof positioned to contact ground strip C. Similarly vehicle 26, illustrated in FIG. 3A, has current collectors 112, 114 mounted thereon with current collector 112 located in the same position as the corresponding collector of vehicle 24 for also contacting the ground strip C. These current collectors are mounted on the vehicle in any convenient manner known in the art, and are electrically connected in a known manner to motor 48 of their respective vehicles. Current collector 111 of vehicle 24 is mounted on the vehicle to engage contact strips B regardless of which lane the vehicle is in. As seen in FIG. 3 this current collector is located centrally of the vehicle frame. On the other hand, the current collector 114 of vehicle 26 is located off center from the center line of the vehicle body and in spaced relation to its associated current collector 112. This current collector is positioned to engage contact strips A regardless of the lane in which the vehicle is moving. By this arrangement, each of the operators can separately control current supply and polarity to contact strips A, B to control a respective one of the vehicles 24, 26 regardless of the lane occupied by the vehicle.

Figure 7:
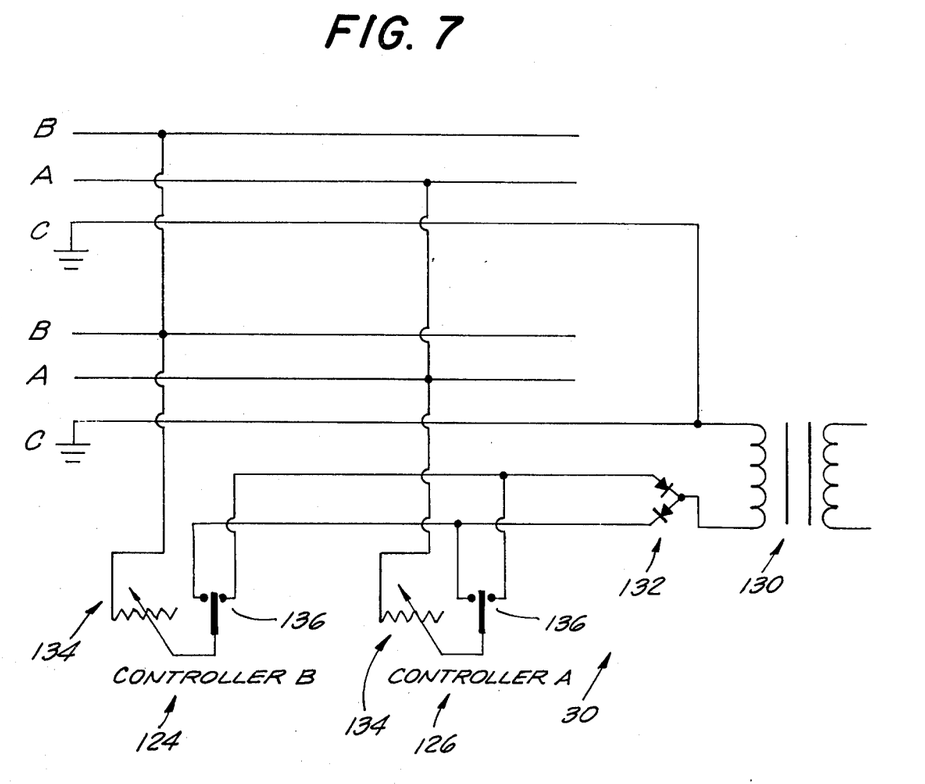
FIG. 7 is a schematic electrical circuit diagram of the electrical control system used for the toy vehicle game of FIG. 1.

The control system 30 for the toy vehicle game illustrated in FIG. 1, is shown schematically in FIG. 7. This control system includes respective controllers 124, 126 by which the players can control the vehicles 24, 26 respectively. Essentially the control system includes a plug 128 by which the system can be connected to an electrical AC power source, and it includes a transformer 130. Power is supplied from the transformer 130 through a halfwave rectifier 132 including two diodes connected as shown to separately supply current to the controllers 124, 126. Each controller is provided as a hand held unit and includes a variable resistor 134, operated as a trigger on the unit, as well as a single pole double throw switch 136. Current from controller 124 is supplied through its variable resistor 134 to the contact strips B and current from the controller 126 is supplied through its variable resistor to the contact strips A. The variable resistors may be of any convenient construction to permit the operators to vary the current supplied to their respective contact strips, and thus their respective vehicles, in order to vary the speed of the vehicles.

The polarity of the current supplied to the toy vehicles is separately and independently controlled by switches 136 so that the polarity of current supplied to motor 48 of the respective vehicles, as controlled by the respective controllers, will vary in accordance with the position in which the switches 136 are placed. By this arrangement each player, using his controller 126 or 124, can control the speed of his vehicle along the track 12 and he can also variably position his vehicle along the track simply by changing the polarity of current supplied to the vehicle. As described above the polarity of the current supplied to the motor of the respective toy vehicles will determine which of the two rear drive wheels is powered, and this will determine which lane the vehicle will be driven to.

As illustrated in FIG. 1, when it is desired to switch a vehicle from the outer lane to the inner lane, as shown with vehicle 26, the polarity of current supplied to the vehicle is selected to drive the outer or right wheel of the vehicle thereby moving the vehicle leftwardly into the inner lane. Likewise, when it is desired to move the vehicle outwardly the inner or left wheel of the vehicle is driven, by properly selecting the polarity of current supplied to the motor of the vehicle, so that the vehicle will move toward the right and into the outer lane. Thus the operators have complete control over both the speed of the vehicle and the lane in which the vehicle will move.

In the illustrative embodiment of the invention, when a drone car 28 having a constant speed of movement is utilized, an obstacle is provided in the outer lane of the track which the players must pass in order to continue moving along the track. This enhances the play value of the game as all players will have to pass the drone car during the game at some stage of operation of the game, and this introduces a further variable factor into the game requiring an additional degree of skill and vehicle control in order to win the "race".

Figure 8:
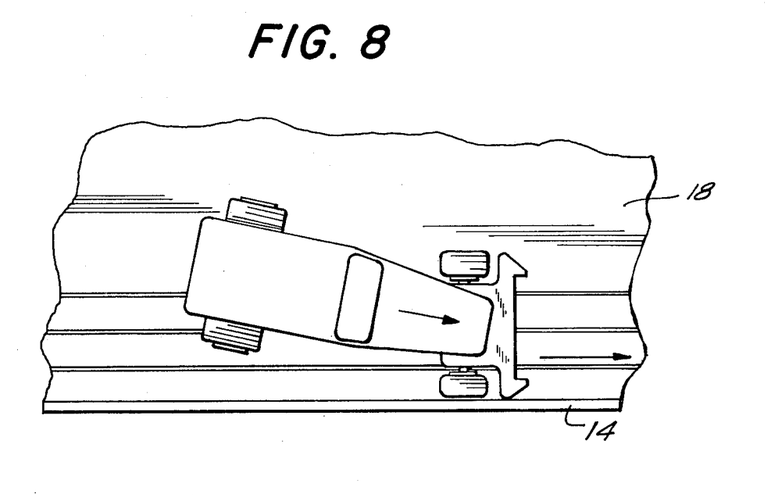
FIG. 8 is an enlarged view illustrating the impact of a vehicle against one of the side walls of the track during a lane change.

As mentioned, the toy vehicles of the present invention include shock absorbing front ends 38. In the embodiment of the invention illustrated in FIG. 3 the front end 38 includes a wheel support plate 130 pivotally mounted by a pivot pin 132 or the like on frame 32 of the vehicle. The plate includes bosses 134 of any convenient form which rotatably mount a shaft 136 on which the front wheels 138 of the toy vehicle are secured. Plate 30 is held in its centered position, so that the front wheels of the vehicle will normally direct the vehicle in a straight line, by a spring arrangement 140 which includes an integral tongue 142 formed with the plastic plate 130. This tongue is captured between a pair of posts or abutment members 144 formed in frame 32. By this arrangement plate 130, and thus wheels 138, are resiliently held in their centered position. However, when the vehicle changes lanes and impacts against one of the side walls (for example the outer walls 14, shown in FIG. 8) the plate 130 will pivot in response to that impact and the shock of that impact will be absorbed by the spring element or tongue 142. At the same time the pivotal movement of the plate will turn wheels 138 therewith and direct them along the desired path of travel, thereby insuring that the vehicle will move into alignment with the contact strips of the track, as quickly and rapidly as possible. To assist in the shock absorbing feature of the invention plate 130 is provided with enlarged bumper elements 146 which extend outwardly beyond the frame of the vehicle so that the bumper elements engage the side wall of the track before the vehicle or any portion thereof.

Figure 3A:
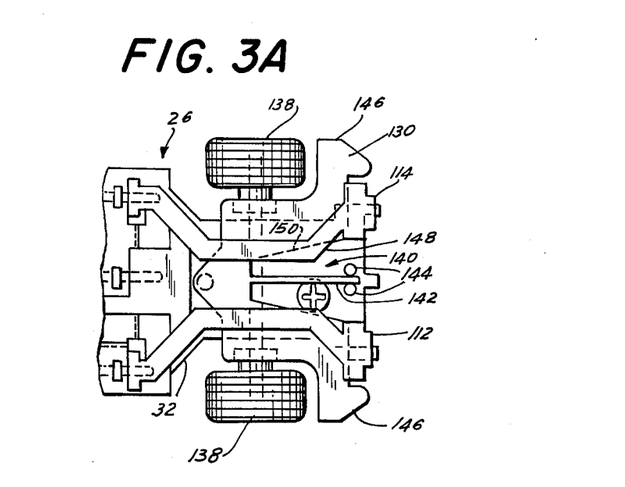
FIG. 3A is a bottom view of the front end portion of a second vehicle used in the game of FIG. 1.

As seen in FIG. 3A tongue 142 is defined between slots 148 formed in plate 130 on opposite sides of the tongue. These slots have outer edges 150 which will engage against posts 144 in the event plate 130 is pivoted a sufficient distance. The engagement of the side edges 150 of the slots against the posts 144 will limit the pivotal movement of the plate beyond a predetermined maximum position.

Figure 9:
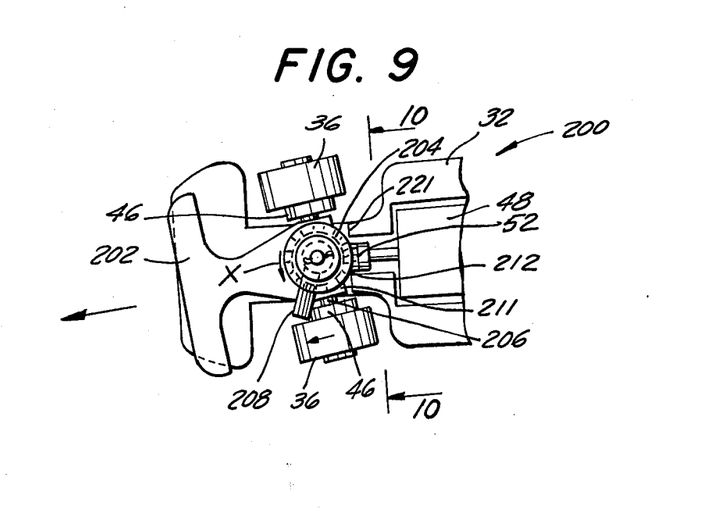
FIG. 9 is a partial plan view, similar to FIG. 4, illustrating another embodiment of the present invention wherein the front wheels of the vehicle are driven and steered.
Figure 10:
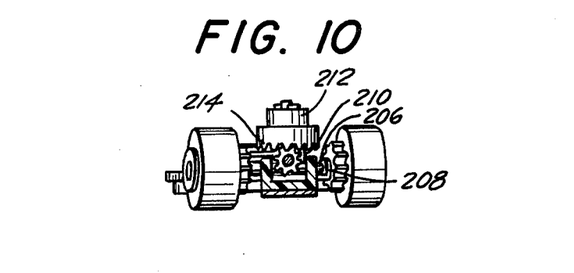
FIG. 10 is a section view taken along line 10—10 of FIG. 9.
Figure 11:
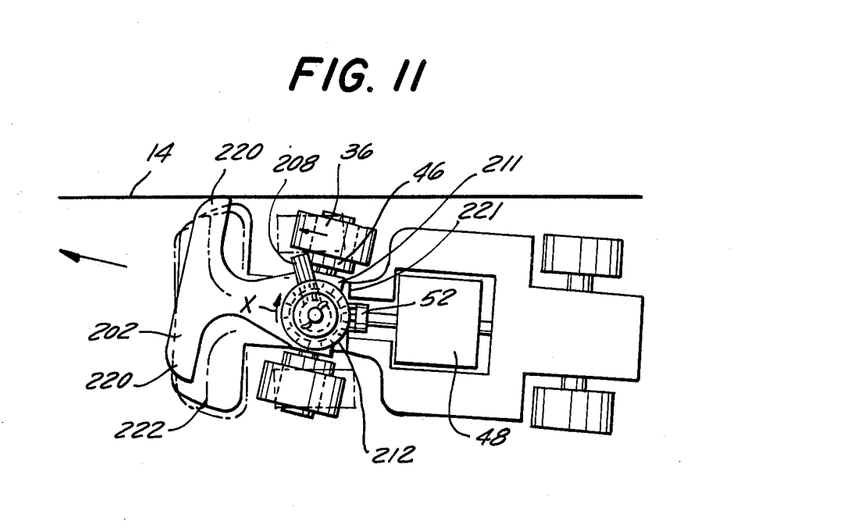
FIG. 11 is another plan view of the embodiment of the invention of FIG. 9 showing the vehicle steered in the opposite direction and banking against a side wall of the tank.

In yet another embodiment of the invention illustrated in FIGS. 9-11, a toy vehicle 200 is provided in which steering control for the vehicle is provided by using the drive direction of the electric motor 48 to control positioning of the front wheels 36 of the vehicle. In this embodiment of the invention a toy vehicle includes a frame or chassis 32, similar to the previously described frame of the earlier embodiments, on which the D.C. electric motor 48 is mounted in a relatively fixed position in any convenient manner. In addition the chassis includes a guide or steering plate 202 which is pivotally mounted on the toy vehicle for relatively free rotation about a central post 204. The plate 202 carries a front axle 206 rotatably mounted thereon, in bosses 208 or the like in any convenient manner, to which the front wheels 36 are secured. In the illustrative embodiment of the invention the front wheels are pinned or splined to the axle 206 for joint rotation therewith, but it is contemplated that the front wheels may be independently rotatably mounted on the axle 206 if desired.

The front wheels 36 include integrally formed or rigidly connected drive gears 46, which are positioned to engage a movable transmission element or gear 208.

Gear 208 is rotatably mounted on a central collar 210, corresponding essentially to the collar 68 described above with respect to the embodiment of FIG. 2, which collar is in turn rotatably mounted on the central support post 204. A crown gear 212 is rotatably mounted on the post 204 above collar 210 with its teeth 214 meshingly engaged with the gear 208.

Crown gear 212 is also drivingly engaged with the output gear 52 of the motor 48 so that when the motor is driven, rotation of the output gear 52 drives the crown gear 212 and thus the movable gear element 208.

In this embodiment of the invention, when the gear 52 is driven in the direction which will cause the crown gear 212 to rotate in the direction of the arrow X illustrated in FIG. 9, that rotation of the crown gear will urge the gear 208 to move in a counterclockwise direction as illustrated in FIG. 1, as it is driven by the crown gear. This will cause the gear 208 to become meshingly engaged with the gear 46 of the left front drive wheel 36 to drive that drive wheel in the forward direction. At the same time however the continued rotation of the crown gear 212 urges the gear 208 continuously in the counterclockwise direction and applies a rearwardly directed force to the left wheel 36. This causes the plate 202 to pivot in a counterclockwise direction as seen in FIG. 9, thereby canting the front wheels 36 towards the left. This would cause the vehicle 200 to move towards the left. Thus if the vehicle were in the outer lane of the track 12, as illustrated for example by the vehicle 24 in FIG. 1, the vehicle would move from the outer lane 22 to the inner lane 20 and be driven against the inner wall 16, as in the previously described embodiments of the invention.

When the polarity of current supplied to the motor 48 through the current collectors on the vehicle (which correspond to the current collectors of the vehicles previously described herein) is changed, the output gear 52 of the motor will be driven in an opposite direction, thereby to drive the crown gear 212 in the direction of the arrow Y illustrated in FIG. 11. When the polarity of current supplied to the motor 48 is reversed, the movable transmission gear 208 will be caused to rotate with its collar 210 in a clockwise direction as illustrated by the arrow Y, disengaging the gear from the gear 46 of the left wheel 36 and moving the gear 208 into engagement with the gear 46 of the right wheel 36. When the gear 208 engages the gear 46 of the right wheel, that wheel will be driven in a forward direction. In addition because of the continuing rearwardly driving force applied to the gear 208 by the crown gear 212, and the resultant rearward force applied to the gear 206, the plate 202 will be caused to pivot in a counterclockwise direction canting the drive wheels towards the right of the vehicle. This will cause the toy vehicle to turn to the right. Thus if the toy vehicle were in the inner lane of the track illustrated in FIG. 1 and the polarity of the current supplied to motor 48 were changed to cause front wheels 26 to cant to the right as illustrated in FIG. 11, the vehicle would move from the inner lane to the outer lane of the track.

In accordance with another feature of this embodiment of the invention, the plate 202 includes side portions 220 which extend beyond the periphery 222 of the front end of the frame and act as bumper elements. With this arrangement when the toy vehicle shifts lanes and hits the side wall towards which it is directed, for example the outer side wall 14 illustrated in FIG. 11, the first part of the vehicle to hit the side wall will be the bumper portions 220 of the plate. The engagement of the plate with the side wall will tend to move the plate in a direction opposite to the direction in which the plate is driven as a result of the engagement of the gear 208 with the right front wheel gear 46. This movement of plate 202 will tend to straighten the wheels out along the path of the outer track. However the gear 208 remains in engagement with the gear 46, because of the continuing drive of the crown gear 212, so that forward movement of the vehicle is maintained. In this manner the vehicle rapidly attains its running position along the side wall of the track to insure that the current collectors on the vehicle make proper contact with the current strips in the track.

It is noted that the pivotal movement of plate 202 is limited, to limit the extreme steering portions of the front wheels, by the engagement of the rear edge 211 of the plate with the upstanding stop surfaces 221 of frame 32, so that rotation of crown gear 212 cannot drive the plate beyond the first and second steering limit positions shown in FIGS. 9 and 11.

Figure 12:
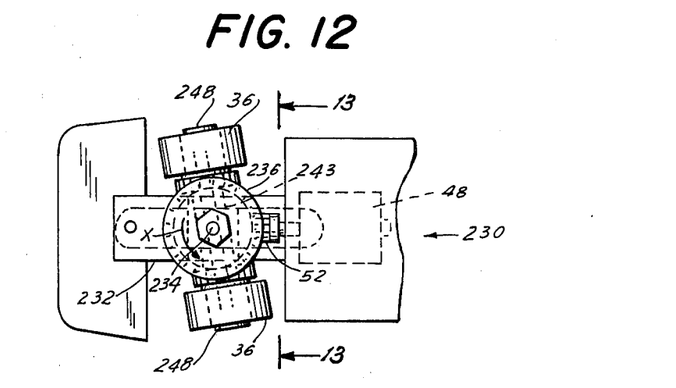
FIGS. 12 and 14 are plan views of another embodiment of the invention including front wheel drive and steering and respectively showing the two drive positions.
Figure 13:
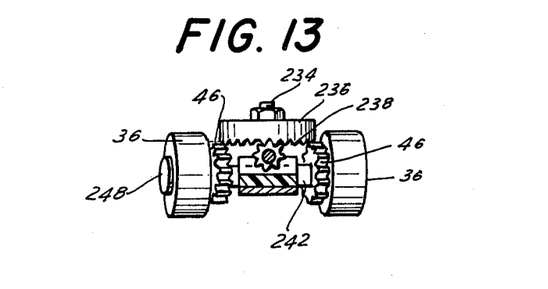
FIG. 13 is a sectional view taken along line 13—13 of FIG. 12.
Figure 14:
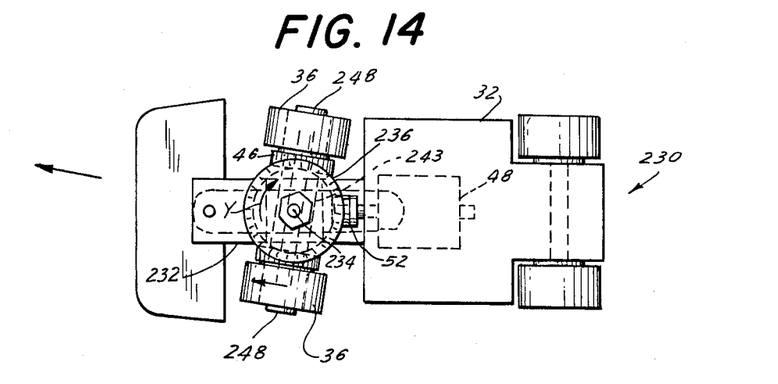

Another embodiment of the invention using a front wheel drive and steering arrangement is illustrated in FIGS. 12–14. In this embodiment a toy vehicle 230 is provided which includes a frame 32 having a D.C. electric motor 48 mounted therein. The front end portion 232 of the frame 32 includes a support post 234 on which a crown gear 236 is rotatably mounted. The crown gear is positioned for meshing engagement with the output gear 52 of the drive motor 48, and has a width sufficient to cause the teeth 238 of the crown gear to meshingly engage the drive gears 46 on the insides of the front wheels 36.

Drive gears 46 in this embodiment of the invention are rotatably mounted on a transverse shaft 240 which is rotatably mounted on a support block or carriage 242 in any convenient manner. The support block 242 is in turn pivotally mounted on the front end 232 of the toy vehicle for rotation about the vertical axis defined by the support post 234. By this arrangement the gears 46 are both simultaneously driven, in opposite directions, by the crown gear 236, regardless of the direction in which the output 52 of the motor 48 rotates. The amount of rotation permitted wheel support block 242 is limited to movement between the two steering positions shown in FIGS. 12 and 16 by stops or stop surfaces 243 on frame 32 which are positioned to engage and block further pivotal movement of support blocks 242 in the first and second steering limit positions shown.

The front drive/steering wheels 36 of the toy vehicle of this embodiment of the invention include conventional one way clutches located within their hubs 248, in any convenient manner, for selective driving engagement with their associated drive gears 46. These clutches may be conventional ball type over running clutches which are oppositely positioned in the hubs, so that one of the wheels 36 will be driven in the forward direction regardless of the direction of rotation of the crown gear 236.

For example, in the position illustrated in FIG. 12, when the output gear 52 of motor 48 is rotated to drive the crown gear 236 in a counterclockwise direction as indicated by the arrow X, the right drive wheel 36 will be driven in a forward direction, while the left drive wheel 36 will not be driven because the one way clutch contained within its hub 248 will not permit power to be transferred from the gear 46 associated therewith to the wheel 36. Thus the left wheel 36 will essentially free wheel, even though its associated gear 46 is rotated in a rearward direction by the crown gear 236. However, because of the direction of rotation of the crown gear 236, and the resultant force applied to the gears 46 associated therewith, the support block 242 on which the gears 46 are rotatably mounted will be caused to rotate in a counterclockwise direction to cant the front wheels towards the left so that if the vehicle 230 were moving in the outer lane of the track illustrated in FIG. 1, the vehicle would move from that outer lane towards the inner lane and into the inner track 20. On the other hand, when the polarity of current supplied to the motor 48 is reversed, in order to drive the crown gear 236 in a clockwise direction as indicated by the arrow Y in FIG. 14, the left front drive wheel 36 will be driven through the clutch contained within its hub 248, while the right front drive wheel 36 will free wheel, since the one way clutch positioned in its hub 248 will not permit transfer of rotation from its associated gear 46 to the wheel. Again, because of the direction of rotation of the crown gear 236, which applies a couple force to the carrier 242, that carrier will rotate about the axis defined by the post 234 in a clockwise direction to cant the wheels towards the right so that the vehicle 230 will move towards the right during play of the game. Thus if the vehicle is in the inner lane, and the polarity of current supplied to the vehicle is changed to rotate the crown gear 236 in the direction illustrated in FIG. 14, the vehicle will move from the inner lane to the outer lane.

In addition, it is noted that although the embodiment of the invention illustrated in FIG. 14 of the drawing is not illustrated as using the movable mounting plate for the front wheels corresponding to the plate 202 of the prior embodiment, it is contemplated that the carriage 242 could be mounted on such a pivotally mounted plate 202, so that the plate would provide a straightening function for the drive wheels after the vehicle has engaged one of the side walls of the track upon a change of lanes.

Accordingly it is seen that a relatively simply constructed toy vehicle game is provided in which players have complete independent control over the speed of operation of the toy vehicles, including the ability to cause the toy vehicles to shift independently from one lane to the other in order to pass each other or to pass a drone car moving along the track in a constant speed. This is achieved without the complexities of multiple element steering systems or solenoid bumper and steering arrangements. Moreover, it is accomplished with a simple change in polarity of the current flow to the toy vehicle's motor and eliminates the attendant loss of speed which occurs with previously proposed structures wherein lane changes are provided as a result of shutting off of power to the vehicle motor.

Although illustrative embodiments of the present invention have been described herein with reference to the accompanying drawings, it is to be understood that the invention is not limited to that precise embodiment, but that various changes and modifications may be effected therein by one skilled in the art without departing from the scope or spirit of this invention.

What is claimed is:

1. A toy vehicle comprising a vehicle frame, a pair of laterally spaced selectively driven drive wheels for the vehicle, means for mounting said drive wheels in laterally spaced relation to each other for rotation in vertical planes, a reversible rotary drive motor in said frame, a power output gear operatively connected to said motor for rotation thereby; and gear train means in said frame drivingly engaged with said output gear for selectively driving one of said drive wheels in response to the direction of rotation of said output gear; said gear train means including gear means movably mounted in said frame for movement between first and second positions in response to the direction of rotation of said output gear for selectively driving one of said drive wheels in said first position thereof and the other of said drive wheels in the second position thereof, first and second drive gears respectively drivingly engaged with said drive wheels, said drive gears being located in said frame for selective engagement with said movably mounted gear means in the first and second positions thereof respectively; a first transmission gear drivingly engaged with said output gear and rotatably mounted in said frame, a gear support member rotatably mounted in said frame for rotation about the axis of rotation of said first transmission gear; said movably mounted gear means comprising second and third transmission gears rotatably mounted on said gear support member for rotation on axes extending generally perpendicularly to the axis of rotation of said support member; said second and third transmission gears being located in driven engagement with said first transmission gear and having their axes of rotation located in angular relation to each other whereby said second and third transmission gears are continuously rotated by said first transmission gear and said support member is rotated in response to rotation of said first transmission gear in the direction of rotation of that gear; said second and third transmission gears being respectively associated with said first and second drive gears for selective driving engagement therewith upon rotation of said support member in response to the rotational direction of said first transmission gear thereby to selectively drive said drive wheels.

2. A toy vehicle as defined in claim 1 wherein said output gear is a spur gear and said first transmission gear is a crown gear rotatably mounted in said frame on an axis extending generally perpendicularly to the axis of rotation of the spur gear.

3. In a toy vehicle including a frame, a body mounted on said frame, a plurality of ground engaging wheels mounted in said frame and including a pair of drive wheels; means for mounting said drive wheels in said frame for independent rotation in laterally spaced vertical planes; a reversible electric motor mounted in said frame and drive transmission means mounted in said frame for selectively drivingly connecting said motor to the respective drive wheels; said drive transmission means including at least one transmission element movably mounted in the frame for movement between first and second positions in response to the direction of rotation of the drive motor to respectively drive one or the other of said drive wheels; wherein the improvement comprises said movably mounted transmission element including a gear support post rotatably mounted in said frame and having a pair of angularly related drive gears mounted thereon respectively associated with said drive wheels for respective operative engagement therewith in said first and second positions of the movably mounted transmission element.

4. In a toy vehicle as defined in claim 3 wherein said drive transmission includes means for simultaneously driving said drive gears from said motor regardless of the direction of rotation of the motor whereby said support post rotates in response to the rotation of said gears and in a direction determined by the direction of rotation of the drive motor thereby to selectively drivingly engage one of said drive gears with one of said wheels in accordance with the drive direction of the motor.

5. In a toy vehicle game including a guide track having a pair of upstanding laterally spaced side walls, and at least one toy vehicle on said track including a frame, a body mounted on said frame, a plurality of ground engaging wheels mounted in said frame and including a pair of drive wheels; means for mounting said drive wheels in said frame for independent rotation in laterally spaced vertical planes; a reversible electric motor mounted in said frame and drive transmission means mounted in said frame for selectively drivingly connecting said motor to the respective drive wheels; said drive transmission means including at least one transmission element movably mounted in the frame for movement between first and second positions in response to the direction of rotation of the drive motor to respectively drive one or the other of said drive wheels; wherein the improvement comprises said movably mounted transmission element including a gear support post rotatably mounted in said frame and having a pair of angularly related drive gears mounted thereon respectively associated with said drive wheels for respective operative engagement therewith in said first and second positions of the movably mounted transmission element.

6. In a toy vehicle game including a frame, a vehicle body mounted on said frame, a plurality of ground engaging wheels rotatably mounted on said frame and including a pair of laterally spaced drive wheels; means for mounting said drive wheels in said frame for independent rotation in laterally spaced planes; a reversible electric motor mounted in said frame and having a rotary power output element; drive transmission means mounted in said frame for selectively drivingly connecting said output element to the respective drive wheels; said drive transmission means including at least one transmission element movably mounted in said frame between first and second positions in response to the direction of rotation of said output element to respectively drive one or the other of said drive wheels; and means for selectively reversing the polarity of current supplied to said drive motor thereby to control the direction of rotation of said output drive element to selectively drive one or the other of said drive wheels; wherein the improvement comprises said movably mounted transmission element including a gear support post rotatably mounted in said frame and having a pair of angularly related drive gears mounted thereon respectively associated with said drive wheels for respective operative engagement therewith in said first and second positions of the movably mounted transmission element.

7. In a toy vehicle game as defined in claim 6 wherein said drive transmission includes means for simultaneously driving said drive gears from said motor regardless of the direction of rotation of the motor whereby said support post rotates in response to the rotation of said gears and in a direction determined by the direction of rotation of the drive motor thereby to selectively drivingly engage one of said drive gears with one of said wheels in accordance with the drive direction of the motor.

8. In a toy vehicle game including at least two toy vehicles each of which comprises a frame, a vehicle body mounted on said frame, a plurality of ground engaging wheels rotatably mounted on said frame including a pair of laterally spaced drive wheels; means for mounting said drive wheels in said frame for independent rotation in laterally spaced fixed planes; a reversible electric motor mounted in said frame and having a rotary power output element; drive transmission means mounted in said frame for selectively drivingly connecting said output element to the respective drive wheels of its associated vehicle; said drive transmission means including at least one transmission element movably mounted in said frame between first and second positions in reference to the direction of rotation of said output element to respectively drive one or the other of said drive wheels; and means for separately supplying current to the electric motors of the respective toy vehicles including means for independently and selectively reversing the polarity of the current supplied to the drive motors of the respective vehicles thereby to permit separate and independent control of the direction of rotation of the output drive elements of the respective motors to separately and independently control selection of the drive to the drive wheels of the respective vehicles; said means for separately supplying current to the electric motors of said toy vehicles including a guide track for said vehicles defining an endless path of travel therefor and having a width dimension defining two vehicles lanes permitting the vehicles to move along the track in parallel paths of travel; at least three electrically conductive contact strips located in parallel relation to each other in each of said lanes, with each strip in each lane being electrically connected to a corresponding strip in the other lane to define pairs of electrically connected contact strips and with one of said pairs of strips being connected to electrical ground; means for separately controlling current flow to the other two pairs of contact strips; and means on each vehicle for electrically contacting the ground connected strip and one of the other strips in a lane for supplying current to the vehicle, with the contact means on each of said two vehicles being respectively positioned to contact a different one of the strips in said other two pairs of strips whereby the vehicles' drive motors can be separately controlled in each lane and with both vehicles occupying the same lane, wherein the improvement comprises said movably mounted transmission element including a gear support post rotatably mounted in said frame and having a pair of angularly related drive gears mounted thereon respectively associated with said drive wheels for respective operative engagement therewith in said first and second positions of the movably mounted transmission element.

9. In a toy vehicle game as defined in claim 8 wherein said drive transmission includes means for simultaneously driving said drive gears from said motor regardless of the direction of rotation of the motor whereby said support post rotates in response to the rotation of said gears and in a direction determined by the direction of rotation of the drive motor thereby to selectively drivingly engage one of said drive gears with one of said wheels in accordance with the drive direction of the motor.

* * * * *